(12) United States Patent
King et al.

(10) Patent No.: US 10,190,420 B2
(45) Date of Patent: Jan. 29, 2019

(54) FLARED CROSSOVERS FOR AIRFOILS

(71) Applicant: United Technologies Corporation, Hartford, CT (US)

(72) Inventors: Christopher King, Bristol, CT (US); San Quach, East Hartford, CT (US); Steven Bruce Gautschi, Naugatuck, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 364 days.

(21) Appl. No.: 14/618,912

(22) Filed: Feb. 10, 2015

(65) Prior Publication Data

US 2016/0230565 A1    Aug. 11, 2016

(51) Int. Cl.
| | |
|---|---|
| F01D 5/18 | (2006.01) |
| B22C 9/10 | (2006.01) |
| F01D 9/04 | (2006.01) |
| F01D 25/12 | (2006.01) |

(52) U.S. Cl.
CPC .............. *F01D 5/187* (2013.01); *B22C 9/103* (2013.01); *F01D 5/18* (2013.01); *F01D 9/041* (2013.01); *F01D 25/12* (2013.01); *F05D 2220/32* (2013.01); *F05D 2230/211* (2013.01);
(Continued)

(58) Field of Classification Search
CPC ........ F01D 5/186–5/189; Y02T 50/676; F05D 2230/21; F05D 2230/211; B22C 9/103
See application file for complete search history.

(56) References Cited

U.S. PATENT DOCUMENTS

| 5,246,340 A | * | 9/1993 | Winstanley ............. B23P 15/04 |
| | | | 415/115 |
| 5,263,820 A | | 11/1993 | Tubbs |
| 5,271,715 A | | 12/1993 | Zelesky et al. |
| | | | (Continued) |

FOREIGN PATENT DOCUMENTS

| EP | 2138675 | 12/2009 |
| GB | 2460936 | 12/2009 |
| WO | 2009087346 | 7/2009 |

OTHER PUBLICATIONS

European Search Report for European Patent Application No. 16154876.3 completed May 31, 2016.
(Continued)

*Primary Examiner* — Seth W Mackay-Smith
(74) *Attorney, Agent, or Firm* — Carlson, Gaskey & Olds, P.C.

(57) ABSTRACT

An airfoil according to an example of the present disclosure includes, among other things, an airfoil section having an external wall and an internal wall. The internal wall defines a reference plane extending in a spanwise direction along a surface of the internal wall, a first cavity and a second cavity separated by the internal wall, and a plurality of crossover passages within the internal wall and connecting the first cavity to the second cavity. Each of the plurality of crossover passages defines a passage axis. The passage axis of each of the plurality of crossover passages is arranged at a radial angle relative to a localized region of the reference plane such that the radial angle of at least some of the plurality of crossover passages differs in the spanwise direction.

23 Claims, 7 Drawing Sheets

(52) U.S. Cl.
   CPC .. *F05D 2260/201* (2013.01); *F05D 2260/202* (2013.01); *Y02T 50/676* (2013.01)

(56) References Cited

U.S. PATENT DOCUMENTS

| | | | | |
|---|---|---|---|---|
| 5,498,133 | A * | 3/1996 | Lee | F01D 5/186 416/97 R |
| 5,538,394 | A * | 7/1996 | Inomata | F01D 5/187 415/115 |
| 5,624,231 | A * | 4/1997 | Ohtomo | F01D 5/186 415/115 |
| 5,667,359 | A * | 9/1997 | Huber | F01D 5/186 416/96 A |
| 5,993,156 | A * | 11/1999 | Bailly | F01D 5/187 415/115 |
| 6,264,428 | B1 * | 7/2001 | Dailey | F01D 5/187 415/115 |
| 7,722,326 | B2 | 5/2010 | Beeck et al. | |
| 8,052,390 | B1 * | 11/2011 | Liang | F01D 5/186 416/97 R |
| 8,657,576 | B2 | 2/2014 | Tibbott et al. | |
| 2006/0099074 | A1 * | 5/2006 | Kopmels | F01D 5/186 416/97 R |
| 2007/0253815 | A1 * | 11/2007 | Kopmels | F01D 5/18 416/97 R |
| 2008/0080979 | A1 | 4/2008 | Brassfield et al. | |
| 2009/0274549 | A1 * | 11/2009 | Mitchell | F01D 5/182 415/115 |
| 2010/0254824 | A1 * | 10/2010 | Naik | F01D 5/186 416/97 R |
| 2011/0103971 | A1 * | 5/2011 | Hada | F01D 5/189 416/97 R |
| 2012/0183412 | A1 * | 7/2012 | Lacy | F01D 5/186 416/97 R |
| 2013/0142666 | A1 | 6/2013 | Lee et al. | |
| 2014/0193273 | A1 | 7/2014 | Bommanakatte et al. | |
| 2015/0044029 | A1 * | 2/2015 | Tibbott | F01D 5/18 415/115 |

OTHER PUBLICATIONS

Extended European Search Report for European Patent Application No. 18156708.2, completed Apr. 27, 2018.

* cited by examiner

FLARED CROSSOVERS FOR AIRFOILS

STATEMENT REGARDING FEDERALLY SPONSORED RESEARCH OR DEVELOPMENT

This invention was made with government support under Contract No. N68335-13-C-0005, awarded by the United States Navy. The Government has certain rights in this invention.

BACKGROUND

This disclosure relates to impingement cooling for a component of a gas turbine engine.

Gas turbine engines can include a fan for propulsion air and to cool components. The fan also delivers air into a core engine where it is compressed. The compressed air is then delivered into a combustion section, where it is mixed with fuel and ignited. The combustion gas expands downstream over and drives turbine blades. Static vanes are positioned adjacent to the turbine blades to control the flow of the products of combustion. The blades and vanes are subject to extreme heat, and thus cooling schemes are utilized for each.

SUMMARY

An airfoil according to an example of the present disclosure includes an airfoil section having an external wall and an internal wall. The internal wall defines a reference plane extending in a spanwise direction along a surface of the internal wall, a first cavity and a second cavity separated by the internal wall, and a plurality of crossover passages within the internal wall and connecting the first cavity to the second cavity. Each of the plurality of crossover passages defines a passage axis. The plurality of crossover passages are distributed in the spanwise direction and arranged such that the passage axis of each of the plurality of crossover passages intersects a surface of the second cavity. The passage axis of each of the plurality of crossover passages is arranged at a radial angle relative to a localized region of the reference plane such that the radial angle of at least some of the plurality of crossover passages differs in the spanwise direction.

In a further embodiment of any of the foregoing embodiments, the radial angle of each of the plurality of crossover passages changes in the spanwise direction.

In a further embodiment of any of the foregoing embodiments, the plurality of crossover passages is arranged such that the radial angle decreases as span position increases.

In a further embodiment of any of the foregoing embodiments, a projection of the passage axis of at least one of the plurality of crossover passages extends radially outward relative to the localized region of the reference plane.

In a further embodiment of any of the foregoing embodiments, the plurality of crossover passages is arranged such that the radial angle increases as span position increases.

A further embodiment of any of the foregoing embodiments includes a plurality of film cooling passages within the external wall and extending from the surface of the second cavity.

In a further embodiment of any of the foregoing embodiments, at least some of the plurality of film cooling passages define a first axis common with the passage axis of one of the plurality of crossover passages.

In a further embodiment of any of the foregoing embodiments, at least one of the plurality of film cooling passages defines a first axis arranged at a different radial angle relative to the localized region of the reference plane than the radial angle of at least one of the plurality of crossover passages.

In a further embodiment of any of the foregoing embodiments, the second cavity is bounded by the external wall.

In a further embodiment of any of the foregoing embodiments, the second cavity is bounded by one of a leading edge and a trailing edge of the airfoil section.

In a further embodiment of any of the foregoing embodiments, the airfoil section extends from a platform section, the platform section defining at least one of the plurality of crossover passages.

In a further embodiment of any of the foregoing embodiments, the passage axis of at least one of the plurality of crossover passages is arranged at a first lateral angle relative to the localized region of reference plane, and the passage axis of another one of the plurality of crossover passages is arranged at a second, different lateral angle relative to the localized region of the reference plane.

In a further embodiment of any of the foregoing embodiments, a portion of the passage axis is curvilinear.

In a further embodiment of any of the foregoing embodiments, a cross-sectional area of at least one of the plurality of crossover passages is different than a cross-sectional area of another one of the plurality of crossover passages.

In a further embodiment of any of the foregoing embodiments, each of the plurality of crossover passages includes an inlet port and an outlet port. A pressure drop is defined by a pressure at the inlet port and a pressure at the outlet port. The radial angle of each of the plurality of crossover passages is defined such that the pressure drop is less than or equal to a predetermined threshold.

A casting core for an airfoil according to an example of the present disclosure include a first portion corresponding to a first cavity of an airfoil and a second portion corresponding to a second cavity of the airfoil. Each of the first portion and the second portion extends in a spanwise direction. The first portion defines a reference plane in the spanwise direction along a surface of the first portion. A plurality of connectors couples the first portion and the second portion. The plurality of connectors corresponds to a plurality of crossover passages of the airfoil. Each of the plurality of connectors defines a first axis. The plurality of connectors is distributed in the spanwise direction. The first axis of each of the plurality of connectors is arranged at a radial angle relative to a localized region of the reference plane such that the radial angle of at least some of the plurality of connectors differs in the spanwise direction.

In a further embodiment of any of the foregoing embodiments, the plurality of connectors are arranged such that the radial angle of each of the plurality of connectors decreases as span position increases relative to an inlet portion of the first portion.

A gas turbine engine according to an example of the present disclosure includes a rotor and a vane spaced axially from the rotor. At least one of the rotor and the vane includes an airfoil section. The airfoil section includes an external wall and an internal wall defining a reference plane extending in a spanwise direction along a surface of the internal wall, a first cavity and a second cavity separated by the internal wall, and a plurality of crossover passages within the internal wall and connecting the first cavity to the second cavity. Each of the plurality of crossover passages defines a passage axis. The plurality of crossover passages is distributed in the spanwise direction and arranged such that the passage axis of each of the plurality of crossover passages intersects a surface of the second cavity. The passage axis of each of the plurality of crossover passages is arranged at a radial angle relative to a localized region of the reference plane such that the radial angle of at least some of the plurality of crossover passages differs in the spanwise direction.

In a further embodiment of any of the foregoing embodiments, the airfoil section extends from a platform section, and the plurality of crossover passages are arranged such that the radial angle decreases as span position increases relative to the platform.

In a further embodiment of any of the foregoing embodiments, the plurality of crossover passages includes a first set of crossover passages and a second set of crossover passages. The first set of crossover passages are arranged such that the radial angle decreases as span position increases, and the second set of crossover passages are arranged such that the radial angle increases as span position increases.

Although the different examples have the specific components shown in the illustrations, embodiments of this disclosure are not limited to those particular combinations. It is possible to use some of the components or features from one of the examples in combination with features or components from another one of the examples.

The various features and advantages of this invention will become apparent to those skilled in the art from the following detailed description of an embodiment. The drawings that accompany the detailed description can be briefly described as follows.

DETAILED DESCRIPTION

Figure 1:
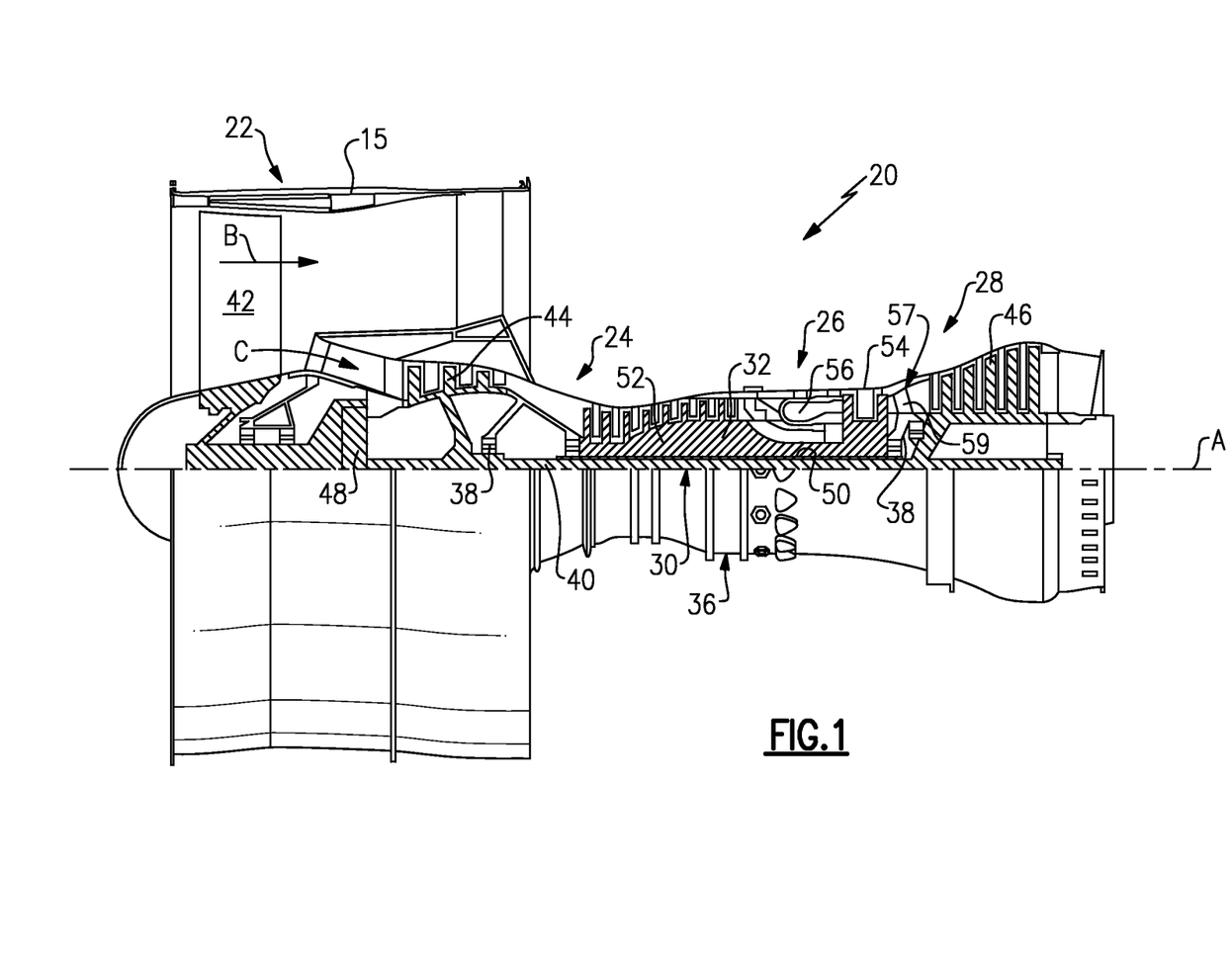
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

Figure 2:
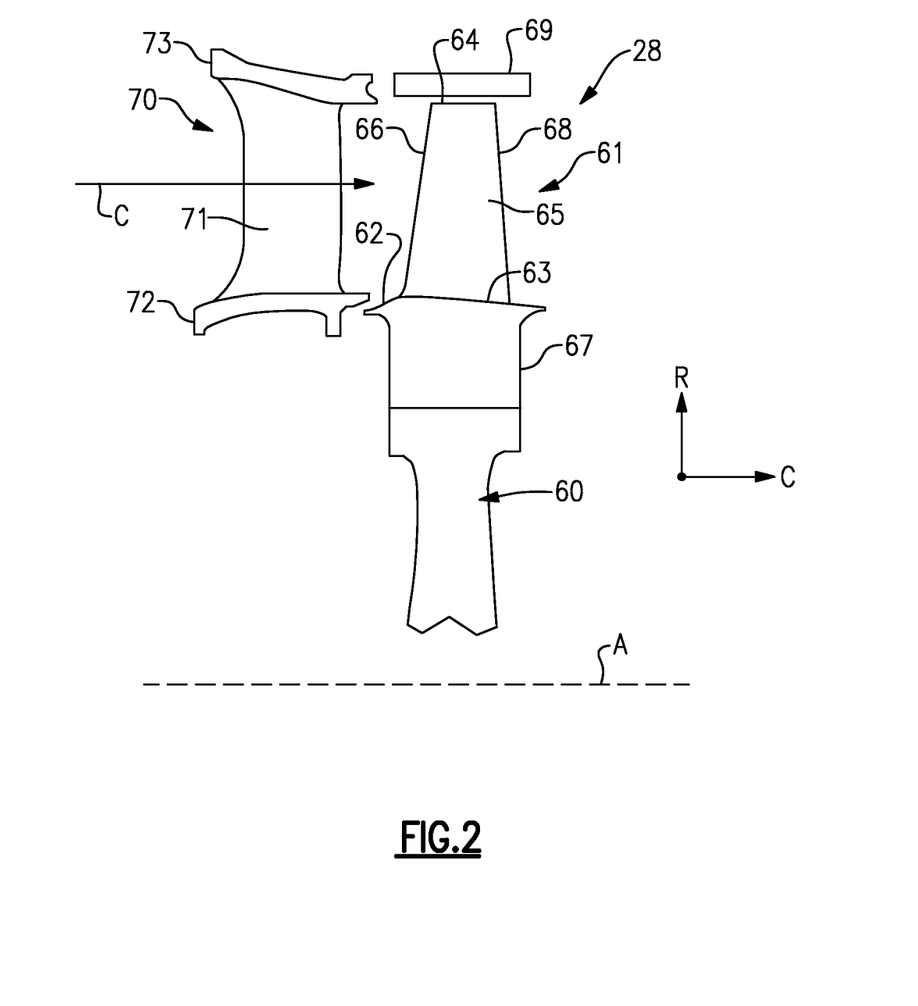
FIG. 2 schematically shows an airfoil arrangement for a turbine section.

FIG. 2 shows selected portions of the turbine section 28 including a rotor 60 carrying one or more airfoils 61 for rotation about the central axis A. In this disclosure, like reference numerals designate like elements where appropriate and reference numerals with the addition of one-hundred or multiples thereof designate modified elements that are understood to incorporate the same features and benefits of the corresponding original elements. In this example, each airfoil 61 includes a platform 62 and an airfoil section 65 extending in a radial direction R from the platform 62 to a tip 64. The airfoil section 65 generally extends in a chordwise direction C between a leading edge 66 to a trailing edge 68. A root section 67 of the airfoil 61 is mounted to the rotor 60, for example. It should be understood that the airfoil 61 can alternatively be integrally formed with the rotor 60, which is sometimes referred to as an integrally bladed rotor (IBR). A blade outer air seal (BOAS) 69 is spaced radially outward from the tip 64 of the airfoil section 65. A vane 70 is positioned along the engine axis A and adjacent to the airfoil 61. The vane 70 includes an airfoil section 71 extending between an inner platform 72 and an outer platform 73 to define a portion of the core flow path C. The turbine section 28 includes multiple airfoils 61, vanes 70, and blade outer air seals 69 arranged circumferentially about the engine axis A.

Figure 3A:
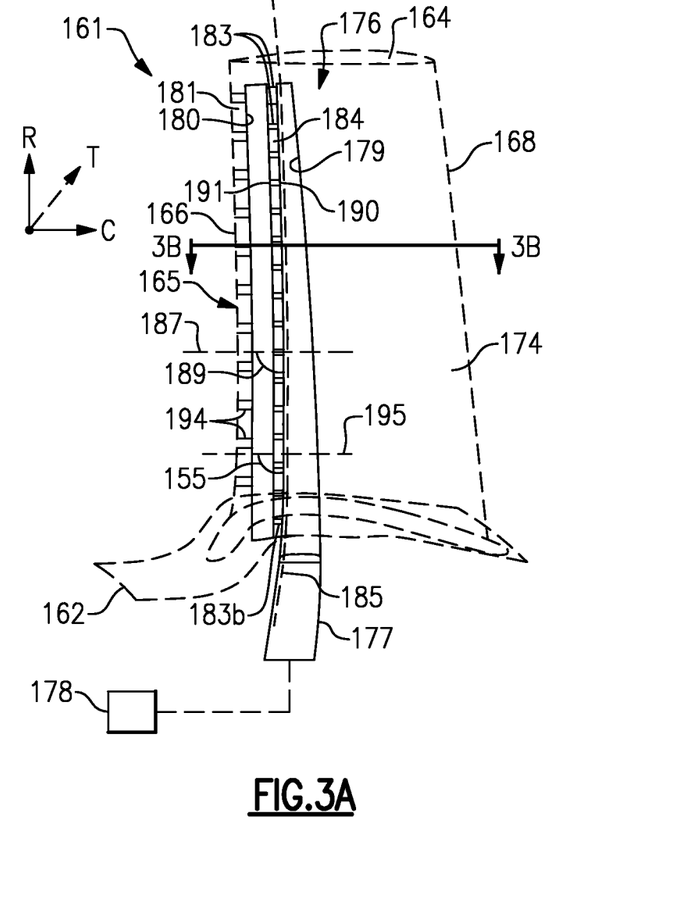
FIG. 3A illustrates a side view of a first embodiment of a cooling arrangement with an airfoil shown in phantom.
Figure 3B:
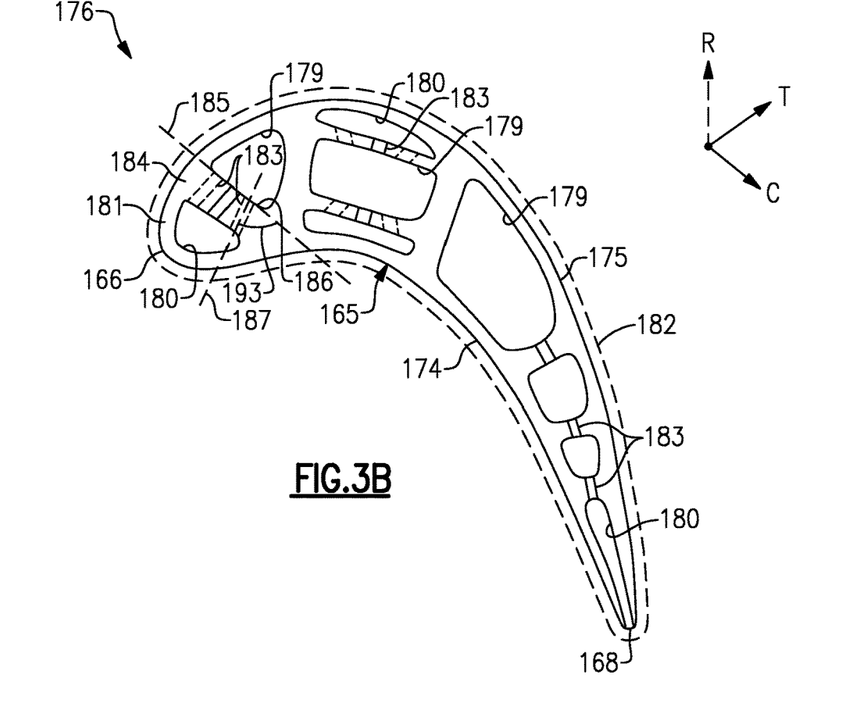
FIG. 3B illustrates a cross section view of the cooling arrangement along line 3B-3B of FIG. 3A.

FIGS. 3A and 3B illustrate an exemplary cooling arrangement 176 for an airfoil 161, such as the one or more airfoils 61 of FIG. 2. Although the exemplary cooling arrangements discussed in the disclosure primarily refer to a turbine blade, the teachings herein can also be utilized for another portion of the engine 20 such as vane 70, for example.

At least one radial cooling passage 177 (only one shown for illustrative purposes) is provided between pressure and suction sides 174, 175 in a thickness direction T which is generally perpendicular to a chordwise direction C. Each radial cooling passage 177 extends from a root section through the platform 162 and toward the tip 164 to communicate coolant to various portions of the airfoil 161. Each radial passage 177 is configured to receive coolant from a coolant source 178 (shown schematically). Other coolant sources 178 can include bleed air from an upstream stage of the compressor section 24, bypass air, or a secondary cooling system aboard the aircraft, for example.

The cooling arrangement 176 includes a feeding cavity 179 (or one of a first cavity and a second cavity) and an impingement cavity 180 (or the other one of the first cavity and the second cavity) extending in a spanwise or radial direction R (only one feeding cavity 179 and one impingement cavity 180 shown in FIG. 3A for illustrative purposes). One of the radial passages 177 or another source communicates coolant to the feeding cavity 179.

The feeding cavity 179 and impingement cavity 180 can be formed in various locations of the airfoil 161. In some examples, the impingement cavity 180 is bounded by an external wall 181 of the airfoil 161. In one example, the feeding cavity 179 and/or impingement cavity 180 are located at the leading edge 166, as shown in FIG. 3A. In another example, the feeding cavity 179 and/or the impingement cavity 180 are located at the trailing edge 168 or between the leading and trailing edges 166, 168 as shown in FIG. 3B. The airfoil section 165 can include multiple feeding cavities 179 and/or impingement cavities 180 to provide cooling to various portions of the airfoil section 165, as illustrated in FIG. 3B.

In some examples, the airfoil 161 includes a thermal barrier coating (TBC) or coating system 182 (shown in FIG. 3B) on an exterior surface of the airfoil section 165 to reduce heat transfer between the core airflow path C and the airfoil section 165. The thermal barrier coating 182 can include, but is not limited to, ceramic material. The thermal barrier coating 182 can further include a bond layer to facilitate adherence.

One or more crossover passages 183 are located within an internal wall 184. The internal wall 184 is arranged to space apart the feeding cavity 179 and the impingement cavity 180. A portion of the airfoil section 165 defines a reference plane 185 extending in the spanwise or radial direction R. The reference plane 185 is defined along a surface 186 of the internal wall 184. The reference plane 185 can be generally planar or can include a curvilinear component, for example. In some examples, the reference plane 185 includes an axial twist between platform 162 and the tip 164.

The crossover passages 183 extend in a chordwise direction C to connect the feeding cavity 179 and the impingement cavity 180. Each of the crossover passages 183 defines a passage axis 187 that intersects a surface of the impingement cavity 180 and/or the feeding cavity 179. The crossover passages 183 are arranged such that coolant provided to the feeding cavity 179 is thereafter communicated to the impingement cavity 180 via the crossover passages 183. The coolant is communicated to the impingement cavity 180 to selectively provide impingement cooling to one or more external walls 181 of the airfoil 161.

The crossover passages 183 are shown having a uniform distribution in the radial direction R. In other examples, the airfoil 161 includes a non-uniform distribution of at least some of the crossover passages 183 in the radial direction R. Although a particular quantity of crossover passages 183 is shown, various quantities of crossover passages 183 can be utilized based on the needs of a particular situation. The crossover passages 183 can also be arranged in other locations of the airfoil 161, including at least one crossover passage 183b (shown in FIG. 3A) located radially below a radially outer surface of the platform 162. In further examples, at least one crossover passage 183b is located radially below the platform 162 and within the root section 67 (shown in FIG. 2). The crossover passages may also be connected to two or more impingement cavities 280a, 280b separated by a partition 288 as shown by crossover passages 283 in a second embodiment 200 in FIG. 4, and/or two or more feeding cavities 379a, 379b as shown by crossover passages 383 in a third embodiment 300 in FIG. 5.

Figure 3C:
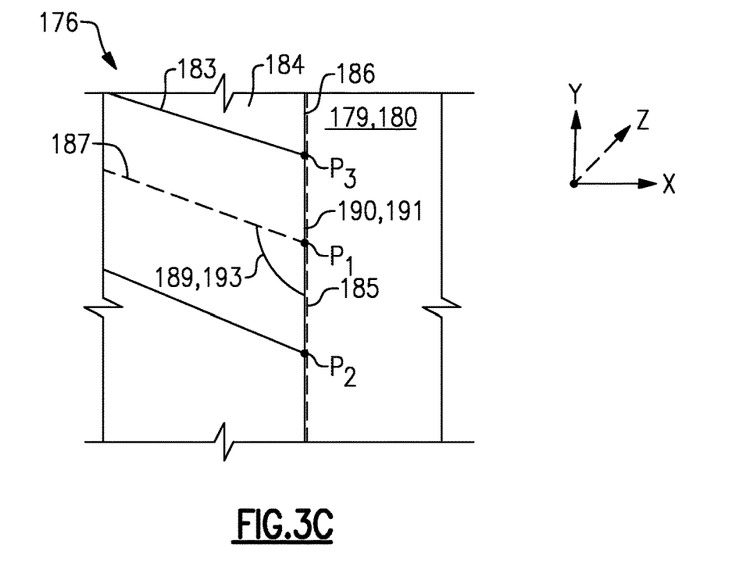
FIG. 3C illustrates selected portions of the cooling arrangement of FIG. 3A.

Each passage axis 187 defines a first or radial angle 189 relative to the reference plane 185. As shown in FIG. 3C, the radial angle 189 is defined at an intersection $P_1$ of the passage axis 187 along a localized region of the reference plane 185 between points $P_2$, $P_3$. Points $P_2$, $P_3$ bound an inlet port 190 or outlet port 191 of the crossover passage 183 in a direction along the axis Y at a surface 186 of the internal wall 184. The passage axis 187 can include curvilinear portions between the inlet port 190 and outlet port 191, for example, but the radial angle 189 is defined by a linear projection of the passage axis 187 from the intersection $P_1$. In some examples, axis X corresponds to engine axis A or a chordwise direction of the airfoil, axis Y extends in a radial direction with respect to the engine axis A, and axis Z extends in a circumferential direction with respect to the engine axis A or a thickness of the airfoil.

In some examples, the radial angle 189 of at least some of the crossover passages 183 changes in the spanwise or radial direction R. In one example, the radial angle 189 of each of the crossover passages 183 changes in the radial direction R or is flared such that the radial angles 189 generally are progressively larger or smaller. In other examples, the crossover passages 183 are arranged such that the radial angle 189 is flared or decreases as span position increases for each, or at least some of, the crossover passages as shown by a set of crossover passages 283a in FIG. 4. Span position may be relative to the platform 162, such as 0% span at the platform 162 and 100% span at the tip 64, for example.

Figure 4:
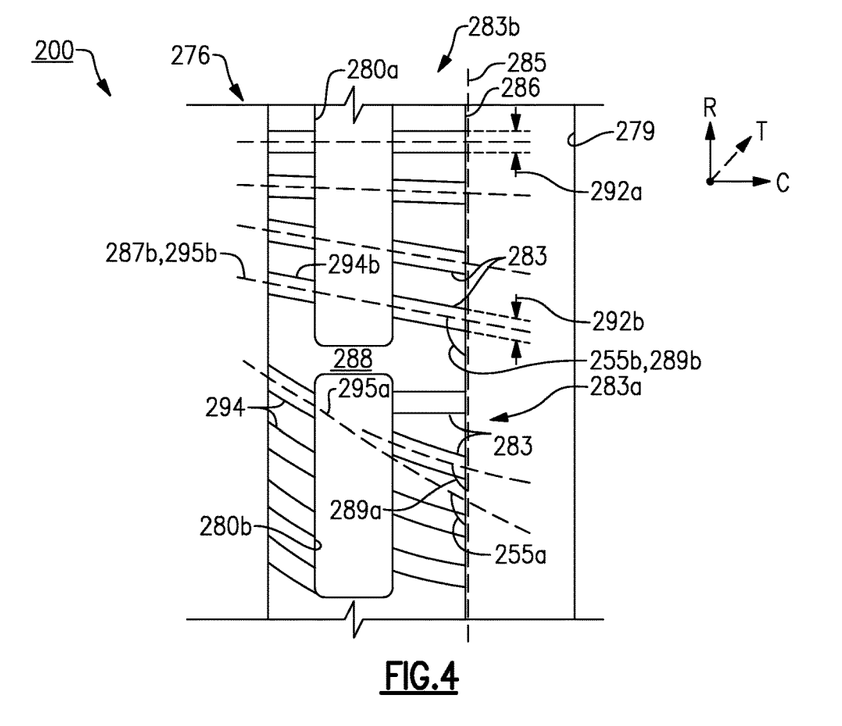
FIG. 4 illustrates a side view of a casting core corresponding to a cooling arrangement.
Figure 5:
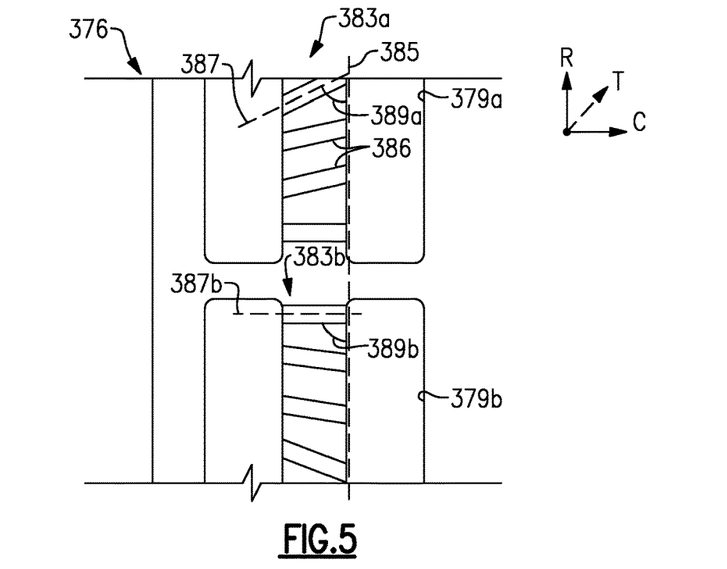
FIG. 5 illustrates a side view of a second embodiment of a cooling arrangement.

In some examples, a projection of the passage axis 287 extends radially outward relative to the reference plane 285, with the radial angle 289 decreasing as span position increases, as shown by the set of crossover passages 283a in FIG. 4. In one example, a projection of the passage axis 387 extends radially inward relative to the reference plane 385, with the radial angle 389 increasing as span position increases for each, or at least some, of the crossover passages 383, as shown by a first set of crossover passages 383b in FIG. 5. In another example, the crossover passages 383 includes a second set of crossover passages 383b arranged such that the radial angle 389b decreases as span position increases, with the first set of crossover passages 383a arranged such that the radial angle 389a increases as span position increases. This arrangement can be utilized in vane 70 (shown in FIG. 2) having coolant provided at each end of the airfoil section 71 to two or more feeding cavities 379a, 379b, for example. In some examples, one or more intermediate sets of adjacent crossover passages 183 has the same or substantially the same radial angle 189, even though the radial angles 189 of other crossover passages 183 spaced by the intermediate set may differ.

In a further example, the radial angles 189 are selected according to a pressure ratio. Each of the crossover passages 183 includes an inlet port 190 and an outlet port 191 (shown in FIG. 3A). The pressure drop or pressure ratio is defined by a pressure at the inlet port 190 and a pressure at the outlet port 191 for a given engine operating condition, such as bucket cruise. In one example, the radial angle 189 of each of the crossover passages 183 is defined such that a pressure drop from the inlet port 190 to the outlet port 191 is less than or equal to a predetermined threshold. This arrangement reduces a likelihood of ingestion of combustion products from the core flow path C into the impingement cavity 180 and crossover passages 183 during operation of the engine 20, for example.

In further examples, a cross-sectional area of at least one of the crossover passages 283 is different than a cross-sectional area of another one of the crossover passages 283 to meter flow from the feeding cavity 279, as shown by distances 292a, 292b in FIG. 4. In one example, the cross-sectional area and the radial angle 189 of each of the crossover passages 183 is defined such that the pressure ratio is equal to or greater than a predetermined threshold. In another example, the cross-sectional area of each of crossover passages 183 changes in the spanwise direction.

The crossover passages 183 can be arranged at various lateral orientations relative to the reference plane 185. As shown in FIG. 3B, the passage axis 187 defines a second or lateral angle 193 relative to the reference plane 185. The lateral angle 193 is orthogonal to the radial angle 189 at intersection $P_1$ (shown in FIG. 3C) and defines a projection of the passage axis 187 laterally or in a thickness direction of the airfoil 161 with respect to the reference plane 185. As shown in FIG. 3C, the lateral angle 189 is defined as an intersection $P_1$ of the passage axis 187 at a localized region of the reference plane 185 between points $P_2$, $P_3$. In some examples, axis X corresponds to engine axis A or a chordwise direction of the airfoil, axis Y extends in a circumferential direction with respect to the engine axis A or a thickness of the airfoil, and axis Z extends in a radial direction with respect to the engine axis A or a span of the airfoil.

In one example, the crossover passages 183 are arranged to define the same or substantially the same lateral angle 193. In another example, at least some of the of crossover passages 183 are arranged having different lateral angles 193 depending on the desired cooling characteristics of the airfoil 161, for example. The crossover passages 183 can be arranged at various spanwise and chordwise angles relative to the reference plane 185 to increase the lengths of the crossover passages 183. The length of each crossover passage 183 can be increased by defining the radial angle 189 and/or lateral angle 193 to increase or otherwise affect the surface area in the crossover passages 183 and the corresponding convective cooling characteristics.

The airfoil 161 may include one or more film cooling holes or passages 194 in fluid communication with the radial cooling passages 177 to provide film cooling to various surfaces of the airfoil 161. The film cooling passages 194 may extend from a surface of the impingement cavity 180, for example. Each of the film cooling passages 194 defines a film cooling axis 195. In further examples, the film cooling axis 195 intersects the reference plane 185 to define a film cooling angle 155. In some examples, the film cooling passages 194 are located within the external wall 181 at the leading edge 166, trailing edge 168, or another location of the airfoil 161.

The film cooling passages can be arranged at various orientations to affect the cooling provided to portions of the airfoil 161. In some examples, and as shown the cooling arrangement 276 in FIG. 4, at least one of the film cooling passages 294b defines a film cooling axis 295b common with a passage axis 287b of one of the crossover passages 283 such that the film cooling angle 255b is equal to, or substantially equal to, the radial angle 289b. In one example, each film cooling axis 295 is common with one of the passage axis 287 as illustrated by a second set of crossover passages 283b. In other examples, one or more of the film cooling passages 294 defines a film cooling angle 255a relative to the reference plane 285 that is different from the radial angle 289a of one of the crossover passages 283, and in one example, is arranged at a different angle than each of the crossover passages 283, as shown by the first set of crossover passages 283a in FIG. 4.

Figure 6:
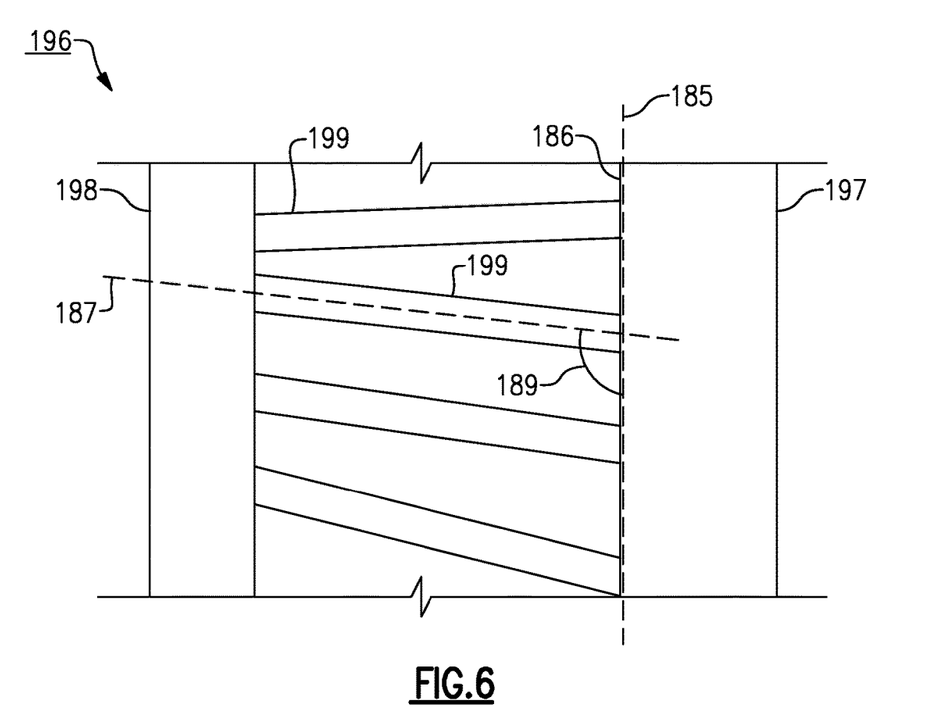
FIG. 6 illustrates a side view of a third embodiment of a cooling arrangement.

FIG. 6 illustrates a portion of a casting core 196 having various vertical arrangements corresponding to various crossover passages 183 of the cooling arrangement 176, for example. The casting core 196 includes a first portion 197 corresponding to the feeding cavity 179 and a second portion 198 corresponding to the impingement cavity 180, for example. In other examples, the first portion 197 corresponds to the impingement cavity 180, and the second portion 198 corresponds to the feeding cavity 179.

One or more crossover connectors 199, which may correspond to the crossover passages 183, connect the first portion 197 and the second portion 198. The first portion 197 and the second portion 198 are spaced apart in a direction of the axis X, and the crossover connectors 199 are spaced apart in a direction of the axis Y. In some examples, axis X corresponds to the chordwise direction C of the airfoil 161, and axis Y corresponds to the radial direction R of the airfoil 161. In other examples, reference plane 185 is defined in a direction of the axis Y or spanwise direction along a surface 186 of the first portion 197. Four crossover connectors 199 corresponding to four crossover passages 183 of the cooling arrangement 176 are shown for illustrative purposes, although fewer or more than four crossover connectors 199 can be utilized.

Each of the crossover connectors 199 is arranged relative to the first portion 197 such that the passage axis 187 of the crossover connector 199 defines a radial angle 189 relative to the reference plane 185. The crossover connectors 199 can be arranged to have a radial angle 189 according to any of the corresponding crossover passages 183 discussed herein. In some examples, the radial angle 189 of each, or at least some, of the crossover connectors 199 changes in the spanwise or radial direction R. In one example, the crossover connectors 199 are arranged such that the radial angle 189 decreases as span position increases for each, or at least some of, the crossover connectors 199. In another example, the crossover connectors 199 are arranged such that the radial angle 189 increases as span position increases for each, or at least some of, the crossover connectors 199. It should be appreciated that the crossover connectors 199 may also be arranged according to any of the lateral angles discussed herein. The crossover connectors 199 may also be arranged according to any of the geometries discussed herein, including various cross-sectional profiles.

Figure 7:
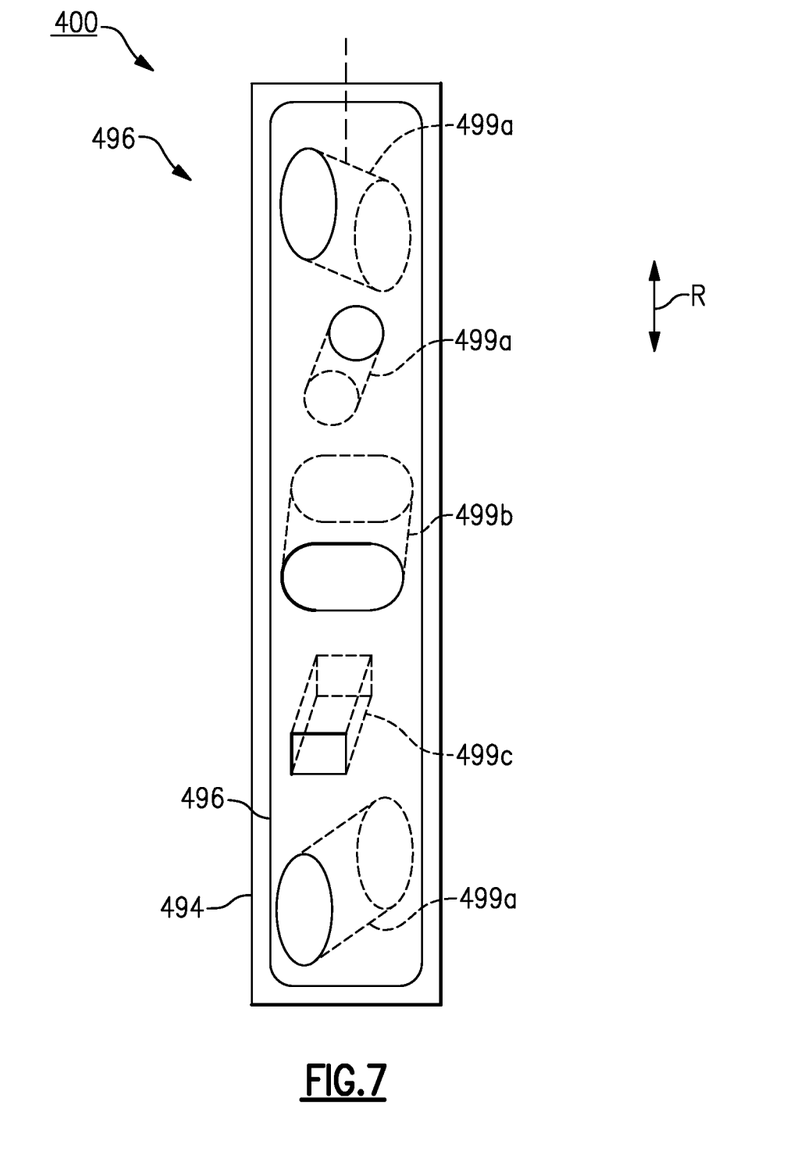
FIG. 7 illustrates a front view of a casting core corresponding to a fourth embodiment of a cooling arrangement.

FIG. 7 illustrates a front view of an embodiment 400 of a casting core 496 illustrating various geometries which can be utilized for any of the crossover passages disclosed herein. The crossover connectors and crossover passages and crossover connectors can be configured having various geometries. As shown, some examples of the crossover connectors can have an elliptical cross-sectional profile, such as crossover connectors 499a. In other examples, the crossover connectors can have a racetrack-shaped geometry as illustrated by the crossover connector 499b. In some examples, the crossover connectors have a rectangular or quadrilateral geometry, such as that illustrated by crossover connector 499c. In addition, in certain examples any single casting core 496 may have substantially similar crossover connector shapes, or may have a combination of the above referenced shapes in a single casting core.

Although particular step sequences are shown, described, and claimed, it should be understood that steps may be performed in any order, separated or combined unless otherwise indicated and will still benefit from the present disclosure.

It should be understood that relative positional terms such as "forward," "aft," "upper," "lower," "above," "below," and the like are with reference to the normal operational attitude of the vehicle and should not be considered otherwise limiting.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An airfoil, comprising:
an airfoil section extending in a spanwise direction from a platform section, said airfoil section extending in a circumferential direction between a pressure side and a suction side, said airfoil section extending in an axial direction between a leading edge and a trailing edge, and said airfoil section having an external wall and an internal wall, said internal wall defining a reference plane extending in said spanwise direction along a surface of said internal wall;
a first cavity and a second cavity separated by said internal wall;
a plurality of crossover passages within said internal wall and connecting said first cavity to said second cavity, each of said plurality of crossover passages defining a passage axis, said plurality of crossover passages distributed in said spanwise direction and arranged such that said passage axis of each of said plurality of crossover passages intersects a surface of said second cavity, said second cavity being an impingement cooling cavity, and wherein said second cavity is bounded by said external wall; and
wherein said passage axis of each of said plurality of crossover passages is arranged at a radial angle relative to a localized region of said reference plane such that said radial angle of at least three of said plurality of crossover passages differs in said spanwise direction, said localized region defined at an intersection of said passage axis and said reference plane, and said radial angle defined such that a component of said passage axis extends in said spanwise direction.

2. The airfoil as recited in claim 1, wherein said radial angle of each of said plurality of crossover passages changes in said spanwise direction.

3. The airfoil as recited in claim 1, wherein said plurality of crossover passages are arranged such that said radial angle decreases as span position increases.

4. The airfoil as recited in claim 3, wherein a projection of said passage axis of at least one of said plurality of crossover passages extends radially outward relative to said localized region of said reference plane.

5. The airfoil as recited in claim 1, comprising a plurality of film cooling passages within said external wall and extending from said surface of said second cavity.

6. The airfoil as recited in claim 5, wherein at least some of said plurality of film cooling passages define a first axis common with said passage axis of one of said plurality of crossover passages.

7. The airfoil as recited in claim 5, wherein at least one of said plurality of film cooling passages defines a first axis arranged at a different radial angle relative to said localized region of said reference plane than said radial angle of at least one of said plurality of crossover passages.

8. The airfoil as recited in claim 1, wherein said second cavity is bounded by one of a leading edge and a trailing edge of said airfoil section.

9. The airfoil as recited in claim 8, wherein said radial angle of said at least three of said plurality of crossover passages progressively changes in said spanwise direction.

10. The airfoil as recited in claim 9, wherein said at least three of said plurality of crossover passages includes four crossover passages.

11. The airfoil as recited in claim 1, wherein said platform section defines at least one of said plurality of crossover passages.

12. The airfoil as recited in claim 1, wherein said passage axis of at least one of said plurality of crossover passages is arranged at a first lateral angle relative to said localized region of said reference plane, and said passage axis of another one of said plurality of crossover passages is arranged at a second, different lateral angle relative to said localized region of said reference plane.

13. The airfoil as recited in claim 12, wherein each of said first lateral angle and said second lateral angle is orthogonal to said radial angle of a respective one of said passage axis such that each said passage axis extends in said circumferential direction of said airfoil section with respect to said localized region of said reference plane.

14. The airfoil as recited in claim 1, wherein a portion of said passage axis is curvilinear.

15. The airfoil as recited in claim 1, wherein a cross-sectional area of at least one of said plurality of crossover passages is different than a cross-sectional area of another one of said plurality of crossover passages.

16. The airfoil as recited in claim 1, wherein each of said plurality of crossover passages includes an inlet port and an outlet port, a pressure drop being defined by a pressure at said inlet port and a pressure at said outlet port, and said radial angle of each of said plurality of crossover passages is defined such that said pressure drop is less than or equal to a predetermined threshold.

17. The airfoil as recited in claim 16, wherein said plurality of crossover passages includes a first set of crossover passages and a second set of crossover passages, said first set of crossover passages are arranged such that said radial angle decreases as span position increases, and said second set of crossover passages are arranged such that said radial angle increases as span position increases.

18. A casting core for an airfoil, comprising:
a first portion corresponding to a first cavity of an airfoil section and a second portion corresponding to a second cavity of the airfoil section, the airfoil section extending in a spanwise direction from a platform section, each of said first portion and said second portion extending in said spanwise direction, said first portion defining a reference plane in said spanwise direction along a surface of said first portion, said second cavity being an impingement cooling cavity, and wherein said second cavity is bounded by an external wall of said airfoil section;
a plurality of connectors coupling said first portion and said second portion, said plurality of connectors corresponding to a plurality of crossover passages of the airfoil, each of said plurality of connectors defining a first axis, said plurality of connectors being distributed in said spanwise direction; and
wherein said first axis of each of said plurality of connectors is arranged at a radial angle relative to a localized region of said reference plane such that said radial angle of at least three of said plurality of connectors differs in said spanwise direction, said localized region defined at an intersection of said first axis and said reference plane, and said radial angle defined such that a component of said first axis extends in said spanwise direction.

19. The casting core for an airfoil as recited in claim 18, wherein said plurality of connectors are arranged such that said radial angle of each of said plurality of connectors decreases as span position increases relative to an inlet portion of said first portion.

20. A gas turbine engine, comprising:
a rotor and a vane spaced axially from said rotor with respect to an engine axis; and
wherein at least one of said rotor and said vane includes an airfoil section extending in a spanwise direction from a platform section, said spanwise direction extending radially from said engine axis, said airfoil section comprising:
an external wall and an internal wall defining a reference plane extending in said spanwise direction along a surface of said internal wall;
a first cavity and a second cavity separated by said internal wall, said second cavity being an impingement cooling cavity, and wherein said second cavity is bounded by said external wall;
a plurality of crossover passages within said internal wall and connecting said first cavity to said second cavity, each of said plurality of crossover passages defining a passage axis, said plurality of crossover passages distributed in said spanwise direction and arranged such that said passage axis of each of said plurality of crossover passages intersects a surface of said second cavity; and
wherein said passage axis of each of said plurality of crossover passages is arranged at a radial angle relative to a localized region of said reference plane such that said radial angle of at least three of said plurality of crossover passages differs in said spanwise direction, said localized region defined at an intersection of said passage axis and said reference plane, and said radial angle defined such that a component of said passage axis extends in said spanwise direction.

21. The gas turbine engine as recited in claim 20, wherein said plurality of crossover passages are arranged such that said radial angle decreases as span position increases relative to said platform.

22. The gas turbine engine as recited in claim 20, wherein said plurality of crossover passages includes a first set of crossover passages and a second set of crossover passages, said first set of crossover passages are arranged such that said radial angle decreases as span position increases, and said second set of crossover passages are arranged such that said radial angle increases as span position increases.

23. The gas turbine engine as recited in claim 20, wherein said at least three of said plurality of crossover passages includes four crossover passages, and wherein said radial angle of said four plurality of crossover passages progressively changes in said spanwise direction.

* * * * *